(12) United States Patent
Chang et al.

(10) Patent No.: US 8,471,402 B2
(45) Date of Patent: Jun. 25, 2013

(54) POWER SUPPLY SYSTEM AND CONTAINER DATA CENTER INCLUDING SAME

(75) Inventors: Yao-Ting Chang, Taipei Hsien (TW); Chao-Ke Wei, Taipei Hsien (TW); Hung-Chou Chan, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 409 days.

(21) Appl. No.: 12/886,520

(22) Filed: Sep. 20, 2010

(65) Prior Publication Data
US 2012/0013195 A1    Jan. 19, 2012

(30) Foreign Application Priority Data
Jul. 16, 2010    (TW) .................................. 99123383

(51) Int. Cl.
*H02J 1/10* (2006.01)
(52) U.S. Cl.
USPC ........................................................... 307/43

(58) Field of Classification Search
USPC ...................................................... 307/43, 82
See application file for complete search history.

(56) References Cited

U.S. PATENT DOCUMENTS

| 7,215,039 B2 * | 5/2007 | Zambrano et al. | 290/55 |
| 8,344,546 B2 * | 1/2013 | Sarti | 307/64 |
| 2005/0099750 A1 * | 5/2005 | Takahashi et al. | 361/92 |

* cited by examiner

*Primary Examiner* — Carlos Amaya
(74) *Attorney, Agent, or Firm* — Altis Law Group, Inc.

(57) ABSTRACT

A power supply system includes a number of aerogenerators, a number of rectifiers, and a direct current to direct current (DC/DC) converter. A first terminal of each rectifier is connected to a corresponding one of the aerogenerators. A first terminal of the DC/DC converter is connected to second terminals of the rectifiers. A second terminal of the DC/DC converter is connected to a power unit of a container data center. Each rectifier converts the alternating current (AC) generated by the corresponding aerogenerator to a pulsating direct current (DC). The DC/DC converter converts the pulsating DC to a constant voltage DC and supplies power to the power unit.

2 Claims, 1 Drawing Sheet

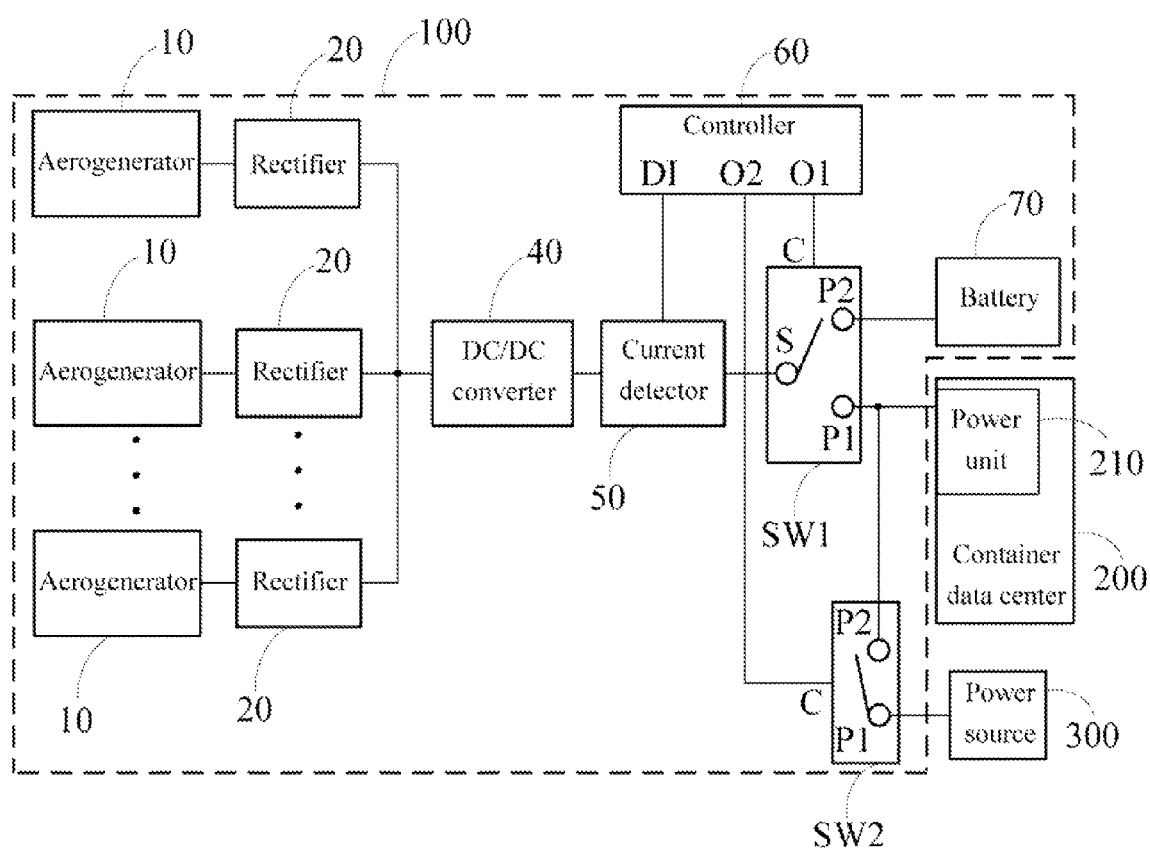

POWER SUPPLY SYSTEM AND CONTAINER DATA CENTER INCLUDING SAME

BACKGROUND

1. Technical Field

The present disclosure relates to a power supply system and a container data center including the power supply system.

2. Description of Related Art

A power supply system converts the voltage of a commercial power to a certain voltage and supplies power to a container data center. However, electricity is wasted in the transmitting the power to the container data center.

BRIEF DESCRIPTION OF THE DRAWING

Many aspects of the present embodiments can be better understood with reference to the following drawing. The components in the drawing are not necessarily drawn to scale, the emphasis instead being placed upon clearly illustrating the principles of the present embodiments. Moreover, in the drawing, all the views are schematic, and like reference numerals designate corresponding parts throughout.

The FIGURE is a block diagram of an exemplary embodiment of a power supply system.

DETAILED DESCRIPTION

The disclosure, including the accompanying drawing, is illustrated by way of examples and not by way of limitation. It should be noted that references to "an" or "one" embodiment in this disclosure are not necessarily to the same embodiment, and such references mean at least one.

Referring to the FIGURE, an exemplary embodiment of a power supply system 100 includes a plurality of aerogenerators 10, a plurality of rectifiers 20, a direct current to direct current (DC/DC) converter 40, a current detector 50, a first switch SW1, a second switch SW2, a controller 60, and a battery 70.

A first terminal of each rectifier 20 is connected to a corresponding one of the aerogenerators 10. A second terminal of each rectifier 20 is connected to a first terminal of the DC/DC converter 40. A second terminal of the DC/DC converter 40 is connected to a first terminal of the current detector 50. A second terminal of the current detector 50 is connected to the first switch SW1. A third terminal of the current detector 50 is connected to an input DI of the controller 60.

The first switch SW1 includes a selecting terminal S, a first contact P1, a second contact P2, and a control terminal C. The selecting terminal S is connected to the second terminal of the current detector 50. The first contact P1 of the first switch SW1 is connected to a power unit 210 of a container data center 200. The second contact P2 of the first switch SW1 is connected to the battery 70. The control terminal C of the first switch SW1 is connected to a first output O1 of the controller 60.

The second switch SW2 includes a first contact P1, a second contact P2, and a control terminal C. The first contact P1 of the second switch SW2 is connected to a power source 300. The second contact P2 of the second switch SW2 is connected to the power unit 210. The control terminal C of the second switch SW2 is connected to a second output O2 of the controller 60.

The aerogenerators 10 are placed on a top of a building. Each aerogenerator 10 generates a three-phase alternating current (AC). Each rectifier 20 converts the three-phase AC to a first pulsating direct current (DC).

The first pulsating DC of the rectifiers 20 are joined to form a second pulsating DC flowing into the DC/DC converter 40. The current of the second pulsating DC is equal to the current amount of the first pulsating DC of the rectifiers 20.

The DC/DC converter 40 converts the second pulsating DC to a constant voltage DC. The constant voltage DC supplies power to the container data center 200 or charges the battery 70.

The current detector 50 detects the current of the constant voltage DC and sends a detecting signal to the controller 60.

The controller 60 receives the detecting signal and determines whether the current of the constant voltage DC is less than a predetermined value.

The controller 60 controls the selecting terminal S of the first switch SW1 to contact the second contact P2 of the first switch SW1 when the current of the constant voltage DC is less than the predetermined value. At the same time, the controller 60 controls the second switch SW2 to connect the power source 300 to the power unit 210. The power source 300 supplies power to the container data center 200.

The controller 60 controls the selecting terminal S of the first switch SW1 to contact the first contact P1 of the first switch SW1 when the current of the constant voltage DC is larger than or equal to the predetermined value. At the same time, the controller 60 controls the second switch SW2 to disconnect the power source 300 from the power unit 210. The aerogenerators 10 supply power to the container data center 200.

The foregoing description of the exemplary embodiments of the disclosure has been presented only for the purposes of illustration and description and is not intended to be exhaustive or to limit the disclosure to the precise forms disclosed. Many modifications and variations are possible in light of the above. The embodiments were chosen and described in order to explain the principles of the disclosure and their practical application to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A power supply system, comprising:
   a plurality of aerogenerators;
   a plurality of rectifiers, wherein a first terminal of each rectifier is connected to a corresponding one of the plurality of aerogenerators, and each rectifier converts the alternating current (AC) generated by the corresponding aerogenerator to a pulsating direct current (DC);
   a direct current to direct current (DC/DC) converter, wherein a first terminal of the DC/DC converter is connected to second terminals of the plurality of rectifiers, a second terminal of the DC/DC converter is connected to a power unit of a container data center, the DC/DC converter converts the pulsating DC to a constant voltage DC, and the constant voltage DC is supplied to the container data center; and
   a current detector, a first switch, a second switch, a controller, and a battery, wherein the second terminal of the DC/DC converter is connected to a first terminal of the current detector, a second terminal of the current detector is connected to a selecting terminal of the first switch, a third terminal of the current detector is connected to an input of the controller, a first contact of the first switch is connected to the power unit, a second contact of the first switch is connected to the battery, a control terminal of the first switch is connected to a first output of the controller, a first contact of the second switch is connected to a power source, a second contact of the second switch is connected to the power unit, a control terminal of the second switch is connected to a second output of the controller, wherein the current detector detects the current of the constant voltage DC and sends a detecting signal to the controller, the controller determines whether the current of the constant voltage DC is less than a predetermined value, the controller controls the selecting terminal of the first switch to contact the second contact of the first switch and controls the second switch to connect the power source to the power unit when the current of the constant voltage DC is less than the predetermined value, and the controller controls the selecting terminal of the first switch to contact the first contact of the first switch and controls the second switch to disconnect the power source from the power unit when the current of the constant voltage DC is larger than or equal to the predetermined value.

2. A container data center, comprising:

a power unit; and a power supply system, wherein the power supply system comprises:

a plurality of aerogenerators;

a plurality of rectifiers, wherein a first terminal of each rectifier is connected to a corresponding one of the plurality of aerogenerators, and each rectifier converts the alternating current (AC) generated by the corresponding aerogenerator to a pulsating direct current (DC);

a direct current to direct current (DC/DC) converter, wherein a first terminal of the DC/DC converter is connected to second terminals of the plurality of rectifiers, a second terminal of the DC/DC converter is connected to the power unit, and the DC/DC converter converts the pulsating DC to a constant voltage DC and supplies power to the power unit; and a current detector, a first switch, a second switch, a controller, and a battery, wherein the second terminal of the DC/DC converter is connected to a first terminal of the current detector, a second terminal of the current detector is connected to a selecting terminal of the first switch, a third terminal of the current detector is connected to an input of the controller, a first contact of the first switch is connected to the power unit, a second contact of the first switch is connected to the battery, a control terminal of the first switch is connected to a first output of the controller, a first contact of the second switch is connected to a power source, a second contact of the second switch is connected to the power unit, a control terminal of the second switch is connected to a second output of the controller, wherein the current detector detects the current of the constant voltage DC and sends a detecting signal to the controller, the controller determines whether the current of the constant voltage DC is less than a predetermined value, the controller controls the selecting terminal of the first switch to contact the second contact of the first switch and controls the second switch to connect the power source to the power unit when the current of the constant voltage DC is less than the predetermined value, and the controller controls the selecting terminal of the first switch to contact the first contact of the first switch and controls the second switch to disconnect the power source from the power unit.

\* \* \* \* \*